United States Patent [19]
Powell

[11] 3,795,802
[45] Mar. 5, 1974

[54] SCANNING SYSTEM USING RADIOACTIVE RADIATION IN CIGARETTE ROD MAKING MACHINE

[75] Inventor: Gordon Francis Wellington Powell, London, England

[73] Assignee: Molins Limited, London, England

[22] Filed: May 14, 1971

[21] Appl. No.: 143,357

[30] Foreign Application Priority Data
May 14, 1970 Great Britain.................... 23528/70

[52] U.S. Cl. ...................... 250/83.3 D, 250/83.6 R
[51] Int. Cl. .......................................... G01n 23/10
[58] Field of Search ................... 250/83.3 D, 83.6 R

[56] References Cited
UNITED STATES PATENTS
2,959,679  11/1960  Powell ........................... 250/83.3 D
3,160,753  12/1964  Varner ........................... 250/83.6 R
3,665,189  5/1972   Maillot ........................... 250/83.6 R
2,586,303  2/1952   Clarke ........................... 250/83.3 D
2,954,775  10/1960  Radley et al. ................... 250/83.3 D
3,159,746  12/1964  Powell et al. .................. 250/83.3 D
3,560,801  2/1971   McArthur ................... 250/83.3 D X Primary Examiner—Archie R. Borchelt
Attorney, Agent, or Firm—Craig and Antonelli

[57] ABSTRACT

A scanning system for a cigarette-making machine or other continuous rod-making machines has a radiation source passing a beam into an ionisation chamber comprising a positive rod electrode surrounded by a tubular negative electrode, and the output current is fed via a responsive-correction circuit which compensates for the slowness of the response of the ions in the ionisation chamber.

19 Claims, 2 Drawing Figures

PATENTED MAR 5 1974

3,795,802

INVENTOR
GORDON FRANCIS WELLINGTON POWELL

BY Craig, Antonelli & Hill

ATTORNEYS

SCANNING SYSTEM USING RADIOACTIVE RADIATION IN CIGARETTE ROD MAKING MACHINE

This invention is concerned with scanning systems for continuous rod making machines and especially for cigarette making machines.

Scanning systems for cigarette making machines are known for example from British patent specification No. 684,503. A development of the scanning system described in that patent has been used in the Molins Mark 8 cigarette making machines, in which the output of the scanning unit is used to vary the position of a trimmer which removes part of the tobacco stream which is subsequently enclosed in a continuous wrapper to form a continuous cigarette rod, as described for example in British patent specification No. 929,338. Thus the scanning system enables the density per unit length of the cigarette rod to be kept substantially constant. However, the speed of response of the scanning system to changes of rod density has hitherto been relatively slow and it is now desirable to provide a much faster response; for example, it may be desirable to enable the output of the scanning system to be used to eject cigarettes which include inadequately filled sections of as little as 10 mm. length where the cigarettes are cut from a continuous rod moving at a speed of 280 meters per minute or higher.

According to one aspect of the present invention a scanning system for a cigarette making machine or other continuous rod making machine includes a scanning unit comprising a radiation source arranged to pass a radiation beam through the rod and into an ionisation chamber having positive and negative electrodes, characterised in that the positive electrode is a rod lying substantially along the axis of a surrounding tubular member which acts as the negative electrode. With this arrangement the strength of the electric field in the ionisation chamber resulting from the electric potential applied to the electrodes is very much stronger in the region of the positive electrode than it is in the region of the negative electrode, because the surface area of the rod is very much smaller than that of the tubular electrode. Thus the current through the ionisation chamber is produced mainly by movement towards the positive electrode of negative electrons released by the radiation beam, and to a much lesser extent by movement of positive ions towards the negative electrode. The electrons move much faster than the ions, so that a major part of the output signal obtained from the scanning unit, which is derived from the electrons, has a fast response; for the system as a whole this response may be of the order of 100 to 200 microseconds, which is fast enough to enable the system to be used to eject cigarettes with short inadequately filled portions.

In a preferred arrangement the scanning system includes a response correction circuit to compensate for the slow response of the part of the output signal contributed by the ions in the ionisation chamber. The response correction circuit preferably comprises a first resistor connected between the ionisation chamber and an output terminal, a second resistor connected between the output terminal and ground, and a capacitor connected across the first resistor, the value of the second resistor in relation to the sum of the two resistors being in a proportion substantially equal to the proportion of the output signal due to the electrons in the ionisation chamber. By this means, with a capacitor of a suitable value, the output voltage is at first increased by the presence of the capacitor by an amount which decays exponentially, and this additional voltage compensates for the slow build-up of the part of the signal due to the ions, which we believe rises substantially in an exponential manner.

The response correction circuit just described may be used with a different form of ionisation chamber, though the ionisation chamber is preferably so constructed that the field strength is greater near the positive electrode (or electrodes) than it is near the negative electrode (or electrodes), so that a major proportion of the output current is due to the movement of electrons in the ionisation chamber.

In a preferred system according to this invention there is a balance unit comprising a radiation source arranged to pass a beam into an ionisation chamber having electrodes of which one is electrically connected to one of the electrodes of the scanning unit and is so polarised as to produce an output current which opposes the output current from the ionisation chamber of the scanning unit. The radiation source for the balance unit need not be as strong as that used in the scanning unit, but it is preferably of the same material (e.g. Strontium 90) so that any decay of the radiation source of the scanning unit is matched by a similar decay of the balance unit source, so that the output signal is substantially unaffected over a fairly long period of operation.

The ionisation chamber of the balance unit may for example have a negative electrode in the form of a plate surrounded by a tubular positive electrode.

A scanning system according to this invention may be used in any of the general systems described in patent application Ser. No. 19,286 filed Mar. 13, 1970.

An example of a scanning system according to this invention is shown in the accompanying drawings.

Figure 1:
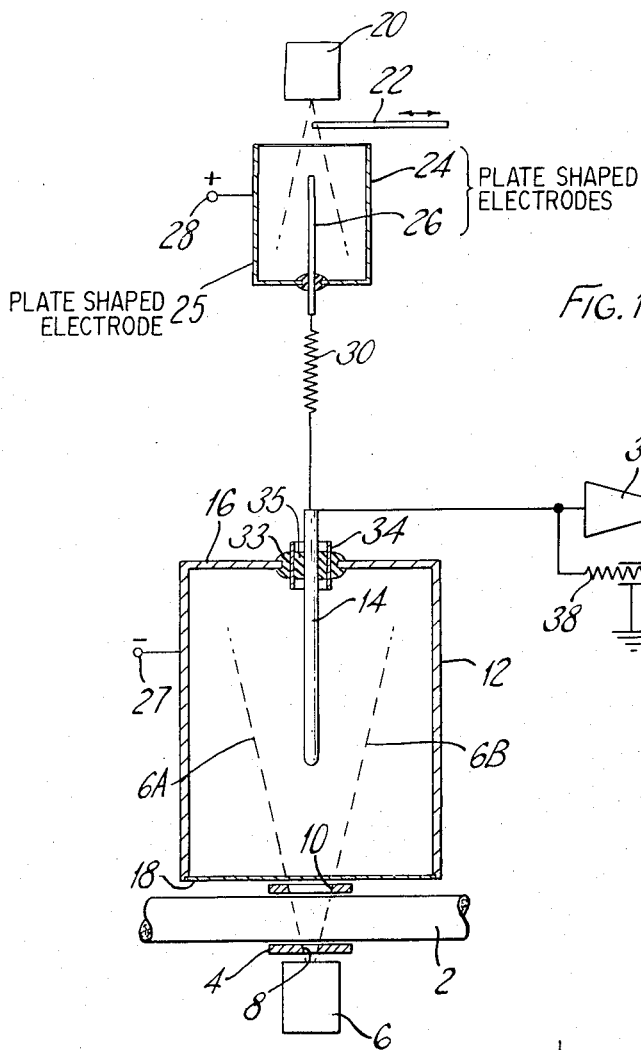
FIG. 1 is a diagrammatic representation of the system.

As shown in FIG. 1, the system is arranged to scan a continuous cigarette rod 2 while it passes through a guide tube 4 of a scanning unit. The scanning unit includes a radiation source 6, for example of 30 millicurie strength, which emits a horizontal beam of Beta rays which diverges to a width measured axially of the rod of approximately 5 mm at the center-line of the cigarette rod. Windows 8 and 10 in the tube 4 are so shaped as to allow the boundaries of the radiation beam to diverge as shown by dotted lines 6A and 6B, the beam being wide enough to cover slightly less than the width of the cigarette rod. The guide tube is shown only diagrammatically; in practice the guide tube may consist of a fixed outer tube with a replaceable inner tube, various inner tubes being available for different cigarette diameters, so that the continuous rod is closely guided. The outer tube may have its windows covered with a thin metal skin to isolate the rod from the scanning system. There may be provision to blow air between the two tubes to keep the inner tube clean.

After passing through the rod, the radiation beam enters an ionisation chamber comprising a cylindrical electrode 12 (negative) of stainless steel and a coaxial rod electrode 14 (positive) of copper, both of these being coaxial with the center-line of the radiation beam. The casing of the ionisation chamber is formed by the cylindrical electrode. The far end wall 16 may be integral with the cylindrical part, as shown, or may be formed of a different material which need not be electrically conductive; with the arrangement shown, the rod is insulated from the end wall 16 by means of ceramic rings 33 and 35 between which there is a metal sleeve 34 which is grounded.

The end of the ionisation chamber through which the radiation beam enters is closed by a thin Mu-metal or nickel sheet 18, for example of 0.025 mm thickness. The interior of the ionisation chamber is filled with Krypton gas at 2 to 2.5 atmospheres pressure, but could alternatively be filled with some other suitable noble gas. The sheet 18 may in practice be secured by bending its edge round the end of the cylinder 12 and clamping the edge by means of a shrink-fitted clamping ring.

The actual dimensions of the ionisation chamber may be as follows. The rod electrode has a diameter of 3 mm and a length in the ionisation chamber of approximately 46 mm. The cylindrical electrode has an internal diameter of approximately 50 mm and an internal length of approximately 54 mm. The thin end wall 18 may bulge outwards by 1 to 2 mm under the pressure of the Krypton gas.

The system includes also a balance unit comprising a radiation source 20 (for example of 1 millicurie strength), an adjustable control member 22 (which partially interrupts the beam) and an ionisation chamber which includes a positive electrode comprising parallel plates 24 and 25, and a negative electrode formed by a middle plate 26. The ionisation chamber is shown smaller than that of the scanning unit, but it may in fact be similar in size; it may in fact be basically the same as the ionisation chamber of the scanning unit, except for having a central plate electrode instead of a rod electrode.

The scanning unit and balance unit are preferably contained in a common housing including a heater and thermostat to maintain them at a fixed temperature, for example 45°C.

A 1,000 volt negative direct-current potential is applied to a terminal 27 connected to the electrode 12 of the scanning unit, while a 500 volt positive direct-current potential is applied to a terminal 28 connected to the electrode 24 of the balance unit. As a result, currents flow from the electrodes 14 and 26 towards an amplifier 36 in opposite directions, these currents being substantially equal when the density of the cigarette rod is at the target level as determined by the position of the control member 22 of the balance unit. Current flows from the balance unit via a high-value resistor 30 of $2 \times 10^{10}$ ohms, which is believed to reduce the effect on the output signal of balance unit "noise".

A feed-back resistor 38 is connected across the amplifier 36. This resistor may for example have a value of approximately $2.5 \times 10^9$ ohms. A grounded sheath 40 surrounds the resistor 38.

The amplifier section is in fact shown only diagrammatically. In practice it should be understood that there would be a load resistor connected between the output end of the amplifier and ground. More specifically there may for example be a variable resistor (of up to 15K ohms) in the line connecting the output end of the amplifier to the right-hand end of the resistor 38, and a similar variable resistor in a line connecting the right-hand end of the resistor 38 to ground. These variable resistors enable the gain of the amplifier to be selectively varied.

The amplifier 36 is a fast junction-type chopper-type field-effect transistor amplifier providing a high gain, for example of the order of $10^5$. An example of such an amplifier is that made by Ancom Limited of Cheltenham, England, and identified as their 15A 7C amplifier. Because of the high gain of the amplifier and of the feedback through the resistor 38, the voltage to ground at the input to the amplifier remains at a very low value. Thus the impedance looking into the input of the amplifier is very low. The circuit therefore has a low time constant; that is to say, a fast response to changes in the current produced by the ionisation chamber of the scanning unit.

Figure 2:
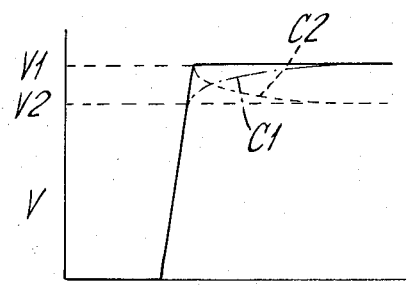
FIG. 2 is a graph illustrating the operation of the response correction circuit.

The fast-response output signal is fed to an output terminal 48 via a response correction circuit consisting of resistors 42 and 44 and a capacitor 46 connected as shown in FIG. 1. This response correction circuit compensates for the slowness of response of the part of the signal due to the ions in the ionisation chamber of the scanning unit. This can be explained with reference to FIG. 2 of the drawings. If a shutter is placed between the source 6 and the ionisation chamber of the scanning unit, and if the shutter is suddenly opened, the output voltage will rise and eventually reach a value of $V_1$. In fact the voltage rises very rapidly to a value $V_2$ on account of the very rapid response of the electrons in the ionisation chamber. $V_2/V_1$ is approximately the proportion of the signal due to the electrons, which in the example described above is believed to be 85 percent. After rising rapidly to the level $V_2$, we believe the voltage rises substantially in an exponential manner to the value $V_1$, as shown by the curve C1. If a relatively slow response time (e.g. of a few milliseconds) were acceptable, the relatively slow build-up of the output voltage to the full value of $V_1$ would not matter. However, in order to provide a much faster response, we compensate for the slowness of the ions by using the response correction circuit shown. This has the effect of adding a voltage which declines exponentially along the curve C2 as the capacitor discharges. The resistors 42 and 44 are such that the proportion (resistor 44/(resistor 42 + resistor 44)) is equal to $V_2/V_1$. Thus the additional fast-response voltage which is added by the response correction circuit takes the output voltage rapidly to the value $V_1$. Then as the additional voltage declines (on account of the capacitor 46 discharging) the basic signal rises (along the curve C1) as the contribution of the ions comes progressively into effect, so that the resultant output voltage at the terminal 48 remains substantially equal to V1.

If the scanning system is needed only to control the mean weight of the cigarette rod (without the facility of ejecting individual unsatisfactory cigarettes) then the output from the amplifier 36 can be fed directly to discriminator circuits which operate when the mean weight of the rod rises or falls outside predetermined limits (e.g. 0.8 percent above or below the target weight) and thus for example move a trimmer in the direction necessary to correct the mean weight. A fast response to changes in the current produced by the ionisation chamber of the scanning unit is not required. In this case the strength of the radiation sources of the scanning unit and balance unit may be reduced respectively to 4 millicuries and 0.5 millicuries.

What I claim as my invention and desire to secure by Letters Patent is:

1. A scanning system for a cigarette making machine or other continuous rod making machine, including a scanning unit comprising a radiation source for passing a radiation beam through the rod and into an ionisation chamber having positive and negative electrodes, the positive electrode being a rod lying substantially along the axis of a surrounding tubular member which acts as the negative electrode, the transverse cross-sectional dimension of the rod in every direction being small compared with the internal diameter of the tubular member acting as the negative electrode, a balance unit comprising a radiation source arranged to pass a radiation beam into an ionisation chamber having electrodes of which one is electrically connected to one of the electrodes of the scanning unit and is so polarized as to produce an output current which opposes the output current from the ionisation chamber of the scanning unit, and means for reducing the noise components in the output current from the balance unit comprising a high-value resistor connected to said one electrode of said balance unit.

2. A scanning system according to claim 1 in which the radiation beam is directed into the ionisation chamber substantially along the axis of the tubular member.

3. A scanning system according to claim 1 including an adjustable control member which partially interrupts the beam from the radiation source of the balance unit.

4. A scanning system according to claim 1 in which the high-value resistor is of the order of $2 \times 10^{10}$ ohms.

5. A scanning system according to claim 1 in which the output currents from the scanning unit and balance unit pass to an output terminal via a fast-response amplifier having negative feedback and a high gain.

6. A scanning system according to claim 5 in which the output signal transmitted from the output terminal is arranged in a cigarette making machine to control the amount of tobacco going into the continuous cigarette rod and is also used to eject individual cigarettes which are inadequately filled with tobacco.

7. A scanning system according to claim 1 in which the scanning unit includes a guide tube for guiding the continuous rod, the guide tube being formed with a window defining the outline of the beam which passes into the ionisation chamber.

8. A scanning system according to claim 7 for a cigarette making machine, in which the dimensions of the window are such that the beam has a width, measured in the direction of the cigarette rod axis, of approximately 5 mm at the center of the rod.

9. A scanning system according to claim 1 in which the positive electrode of the scanning unit is at a voltage of the order of 1000 volts.

10. A scanning system according to claim 1 in which the ionisation chamber is filled with Krypton gas.

11. A scanning system according to claim 10 in which the Krypton gas is at a pressure of approximately 2 to 2.5 atmospheres.

12. A scanning system according to claim 1 including a response correction circuit to compensate for the slow response of the part of the output signal contributed by the ions in the ionisation chamber of the scanning unit, the response circuit comprising a first resistor connected between the ionisation chamber and an output terminal, a second resistor connected between the output terminal and ground, and a capacitor connected across the first resistor, the value of the second resistor in relation to the sum of the resistors being in a proportion substantially equal to the proportion of the output signal due to the electrons in the ionisation chamber.

13. A scanning system for a cigarette making machine, including a scanning unit comprising a radiation source for passing a radiation beam through the continuous cigarette rod and into an ionisation chamber including positive and negative electrodes so arranged that the field strength is greater near the positive electrode or electrodes than it is near the negative electrode or electrodes, so that a major proportion of the output current is due to the movement of electrons in the ionisation chamber, and including a response correction circuit comprising a first resistor connected between the ionisation chamber and an output terminal, a second resistor connected between the output terminal and ground, and a capacitor connected across the first resistor, the value of the second resistor in relation to the sum of the resistors being in a proportion substantially equal to the proportion of the output signal due to the electrons in the ionisation chamber.

14. A scanning system according to claim 13 in which the capacitor is of a value such that it discharges at a rate corresponding substantially to the build-up of the current due to the ions in the ionisation chamber.

15. A scanning system for a cigarette making machine or other continuous rod making machine, including a scanning unit comprising a radiation source for passing a radiation beam through the rod and into an ionisation chamber having a positive rod electrode mounted substantially along the axis of a surrounding tubular member which acts as the negative electrode; a balance unit comprising a radiation source arranged to pass a radiation beam into an ionisation chamber having electrodes of which one is electrically connected to one of the electrodes of the scanning unit and is so polarised as to produce an output current which opposes the output current from the ionisation chamber of the scanning unit; and a response correction circuit to compensate for the slow response of the part of the output signal contributed by the ions in the ionisation chamber of the scanning unit, the response circuit comprising a first resistor connected between the ionisation chamber and an output terminal, a second resistor connected between the output terminal and ground, and a capacitor connected across the first resistor, the value of the second resistor in relation to the sum of the resistors being in a proportion substantially equal to the proportion of the output signal due to the electrons in the ionisation chamber, the capacitor being of a value such that it discharges at a rate corresponding substantially to the build-up of the current due to the ions in the ionisation chamber.

16. A scanning system for a cigarette making machine or other continuous rod making machine, including a scanning unit comprising a radiation source for passing a radiation beam through the rod and into an ionisation chamber having a positive rod electrode mounted substantially along the axis of a surrounding tubular member which acts as the negative electrode; and a balance unit comprising a radiation source arranged to pass a radiation beam into an ionisation chamber having at least one positive plate electrode and at least one negative plate electrode, and being electrically connected to the scanning unit so as to produce an output current which opposes the output current from the ionisation chamber of the scanning unit.

17. A scanning system according to claim 16 in which the balance unit comprises a single centrally mounted negative plate electrode and two positive plate electrodes disposed parallel to and on opposite sides of the negative plate electrode.

18. A scanning system according to claim 16, including a response correction circuit to compensate for the slow response of the part of the output signal contributed by the ions in the ionisation chamber of the scanning unit, the response circuit comprising a first resistor connected between the ionisation chamber and an output terminal, a second resistor connected between the output terminal and earth, and a capacitor connected across the first resistor, the value of the second resistor in relation to the sum of the resistors being in a proportion substantially equal to the proportion of the output signal due to the electrons in the ionisation chamber.

19. A scanning system according to claim 7 for a cigarette making machine, in which the dimensions of the window are such that the beam has a width, in the direction of the cigarette rod axis, which is smaller than the diameter of the cigarette rod.

* * * * *